United States Patent Office 3,142,656
Patented July 28, 1964

3,142,656
DIMETHYLOL-CRESOL MODIFIED POLY-SULPHIDE POLYMER SEALANT
Austin Thomas Carpenter, Leicester, England, assignor, by mesne assignments, to United Shoe Machinery Corporation, Flemington, N.J., a corporation of New Jersey
No Drawing. Filed Dec. 18, 1959, Ser. No. 860,341
Claims priority, application Great Britain Jan. 27, 1959
11 Claims. (Cl. 260—38)

This invention is concerned with improvements in or relating to sealing and coating compositions, and is especially, but not exclusively, concerned with sealing and coating compositions for use in the aircraft industry.

In the aircraft industry, for example for sealing joints in fuel tanks or for glazing windows, compositions are required that will form seals and coatings which are adherent to metal (especially aluminum alloy), glass and wood, which are flexible and will remain so over a wide range of temperature, and which are resistant to solvents, especially petroleum solvents such as oil and aircraft fuel.

It has been proposed to use a composition based on liquid polysulphide polymer for sealing and coating purposes in the aircraft industry, and to include in such a composition a component that imparts to the composition an ability to adhere to surfaces to which it is applied. Resinous materials have been proposed for inclusion as such a component, one specific example being alkali-catalyzed phenol-formaldehyde liquid resin, but it has been observed that the addition of such resin to the composition acts to some extent as an inhibitor of further polymerization of the polysulphide polymer and may impair the development of solvent and heat resistance. Furthermore, in such proposals as there have been to use phenol-formaldehyde resin, it has been intended that the sealing and coating composition should be supplied to the user in two parts, namely a first part comprising the polysulphide polymer and resin and a second part comprising a curing agent. It has been observed, however, that the storage life of a liquid polysulphide polymer into which a liquid phenol-formaldehyde resin has been introduced is limited, a detrimental change in properties being apparent within about three months.

One of the various objects of the invention is to provide an improved composition comprising a liquid polysulphide polymer capable of forming a tough rubbery heat and solvent resistant coating or seal adherent to the surface to which it has been applied. The term "liquid polysulphide polymer" is used herein for brevity to denote a liquid polysulphide polymer having mercaptan terminals and side groups capable of being cured to form an elastomer by further polymerization and cross linkage.

Another of the various objects of the invention is to provide an improved stable composition that can serve as one part of a two part composition capable when the two parts have been mixed together of forming a tough rubbery heat and solvent resistant coating or seal adherent to the surface to which it has been applied.

Ten coating and sealing compositions comprising a liquid polysulphide polymer, a curing agent therefor (viz., lead dioxide), filler, preferably a mineral filler such as calcium carbonate, carbon black, aluminum powder and others, and a small amount of an alkyl substituted phenol dialcohol, or a salt of the dialcohol, which compositions cure of their own accord, are hereinafter described in detail to illustrate the invention in certain of its composition aspects. The compositions are ordinarily made up from two stable parts which are mixed together shortly before use and one of which parts in each case includes the small amount of the alkyl substituted dialcohol (or its sodium salt) and is itself illustrative of the invention in certain other of its composition aspects. The illustrative compositions before being mixed with the second part exhibit little or no change in properties during storage over a period of several months, and after being mixed with the second part can be used to form seals or coatings which cure reliably in a short time, adhere firmly to aluminum alloy and other surfaces and provide rubbery cured products that maintain their initial degree of hardness without substantial change under normal conditions within a wide range of temperature. The resulting seals or coatings are resistant to petroleum solvents and have been found especially suitable for use in sealing or coating fuel tanks in aircraft.

It is believed that the primary function of the alkyl substituted phenol dialcohol material in the illustrative compositions is to improve the adhesion of the composition when it comes to be used to surfaces, especially to surfaces of aluminum alloy, glass and wood, while at the same time not impairing the rate of cure of the liquid polysulphide polymer by the curing agent nor impairing the development of heat and solvent resistance of the cured composition.

The dimethylol-p-cresol, which is the alkyl substituted phenol dialcohol used in preparing most of the illustrative compositions, can be represented as 2:6-bishydroxymethyl-4-methyl phenol. Other phenol dialcohols can be used in preparing compositions according to the invention, the alcohol being one in which one of the other positions in the benzene ring has been substituted by a 1 to 8 carbon atom alkyl (preferably methyl) group. Dimethylol-o-cresol (2:4 bishydroxymethyl-6-methyl phenol) used in preparing one of the illustrative compositions is such another phenol dialcohol.

Dimethylol-p-cresol and dimethylol-o-cresol are crystalline solids and may be used as such or in solution; or salts, e.g., the sodium salts, thereof, may be used, in preparing compositions in accordance with the invention. The proportion of phenol-alcohol used in a coating and sealing composition in accordance with the invention lies preferably in the proportion of from 0.05% to 10% based on the weight of liquid polysulphide polymer, the range 0.1% to 0.3% being generally useful.

It will be seen that the illustrative compositions contain no resinous material. Substantial freedom from resinous material of coating and sealing compositions based on liquid polysulphide polymer is believed to be an advantage both in storage before mixing with the complementary part and in achieving high solvent and heat resistance in the cured product.

The above and other of the various objects and the several features of the invention will become more clear from the following description of the illustrative compositions aforementioned, their preparation and their use, the preparation and use of the compositions being themselves illustrative of the invention respectively in method of preparation and method of sealing and coating aspects. It will be realized that the illustrative compositions and illustrative methods have been selected for description by way of example and not of limitation of the invention.

The illustrative compositions all take the form, initially, of one part of a two part sealing and coating composition to which a second part is added shortly before use. When in the form of one part only of the sealing and coating composition, the illustrative compositions are stable, exhibiting little or no tendency to deteriorate or alter their properties on storage over periods of several months. After being mixed with the complementary part, the illustrative compositions have a limited work life during which they can be spread upon a surface before they set up, due to further polymerization of the liquid polysulphide polymer, to a tough rubbery condition. For convenience in the following description the two stable parts of a sealing and coating composition will be referred to as Parts A and B, Part A being that which contains liquid polysulphide polymer and no curing agent, Part B comprising the curing agent. Parts given are by weight.

In preparing all the illustrative compositions except that in Example VIII, the phenolic alcohol (or its sodium salt) is introduced into the liquid polysulphide polymer as a crystalline solid. Mixing of the ingredients takes place at room temperature. All the examples, except Example VIII, give formulations which provide compositions that can be spread by a spatula or extruded by means of an extrusion gun. These compositions can be thinned with volatile organic solvent (e.g., toluol) or plasticizer (e.g., dibutyl phthalate) if it is desired to apply them by brushing or pouring.

*Example I*

Part A:                                                  Parts
   Thiokol LP2 _____ 1,000
   Filler (activated calcium carbonate) _____ 450
   Titanium dioxide _____ 75
   Dimethylol-p-cresol (crystalline) _____ 0.5
Part B:
   Lead dioxide _____ 100
   Dibutyl phthalate _____ 90
   Stearic acid (retarding agent) _____ 10

Part A (the first illustrative composition) is compounded to the formula shown above. Thiokol LP2 is a liquid polysulphide polymer having molecular weight of 4,000 and prepared by condensing with an alkali polysulphide 98.0 mol percent (2-chloroethyl) formal and 2.0 mol percent of trichlorpropane.

The polymer is believed to have a structure corresponding to the formula

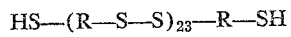

in which R represents the organic group

It is a polyfunctional polymer having reactive mercaptan terminals and side groups so that in the presence of suitable oxidizing agents it polymerizes and cross links to a rubbery condition.

The dimethylol-p-cresol may conveniently be prepared by the room temperature condensation of p-cresol (1 mol) with formalin (2.5 mols) in the presence of 20% sodium hydroxide solution (250 grams). After four days the crystalline sodium salt is removed by filtration, dried and the free phenol obtained by treatment with acid and recrystallization from ethanol.

The ingredients for Part A are roughly mixed and then passed through a double roll mill. Part A is stable, showing little or no change in properties on storage over a period of several months.

On mixing Parts A and B, and spreading the mixture upon the surface of a sheet of Dural (an aluminum alloy) which has been previously freed from grease by means of trichlorethylene vapor, a firmly adherent coating results which cures in about an hour to a hard but flexible rubber having a Shore hardness (as measured by the method of A.S.T.M. D.676–42) of 50° A. This initial hardness is maintained within reasonable limits over a wide range of temperature; it is observed to increase to only 55° A. after subjecting the coating to 100° C. for seven days.

*Example II*

Part A:                                                  Parts
   Thiokol LP2 _____ 1,000
   Filler (activated calcium carbonate) _____ 450
   Titanium dioxide _____ 75
   Stearic acid _____ 2
   Dimethylol-p-cresol (crystalline) _____ 20
Part B: As for Example I.

On mixing Part A (the second illustrative composition) with Part B, the composition remains workable for about two hours, curing being substantially complete after a further one hour. It gives good adhesion to Dural (treated as in Example I), glass and beechwood at the end of this period, the adhesion being maintained on heating at 70° C. for seven days.

*Example III*

Part A:                                                  Parts
   Thiokol LP2 _____ 1,000
   Filler (activated calcium carbonate) _____ 450
   Titanium dioxide _____ 75
   Stearic acid _____ 3
   Dimethylol-p-cresol (crystalline) _____ 0.7 to 40
Part B: As for Example I.

Compositions falling within the formula of Part A (the third illustrative composition) after being mixed with Part B all (irrespective of the amount of dimethylol-p-cresol) show very good adhesion to Dural treated as in Example I. They are unaffected by immersion for seven days at 70° C. in a 75/25 iso-octane/toluene solvent.

*Example IV*

Part A:                                                  Parts
   Thiokol LP2 _____ 1,000
   S.R.F. Carbon Black _____ 300
   Sodium salt of dimethylol-p-cresol (crystalline) _____ 4.6
Part B: As for Example I.

Part A (the fourth illustrative composition) is an example of the inclusion of the dimethylol-p-cresol as its sodium salt. On mixing with Part B, the phenol-dialcohol is liberated by the stearic acid; the composition remains workable for six hours and sets to a strong tough rubber overnight.

*Example V*

Part A:                                                  Parts
   Thiokol LP2 _____ 1,000
   S.R.F. Carbon Black _____ 300
   Sodium salt of dimethylol-p-cresol (crystalline) _____ 4.6
   Stearic acid _____ 22.4
Part B:
   Lead dioxide _____ 100
   Methylcyclohexyl phthalate _____ 50

Part A (the fifth illustrative composition) is an example of a stable composition in which the sodium salt of dimethylol-p-cresol is used but the alcohol is liberated in the composition by the inclusion of stearic acid. The composition is blended on a triple-roll paint mill.

After Parts A and B have been mixed, the composition has a work life of three hours and cures overnight.

*Example VI*

Masterbatch:                                             Parts
   Thiokol LP2 _____ 150
   Sodium salt of dimethylol-p-cresol (crystalline) 30
   Stearic acid _____ 45

This masterbatch is passed through a triple-roll paint mill and then a portion is used as follows:

Part A:                                                  Parts
   Masterbatch _____ 4
   Thiokol LP2 _____ 100
   S.R.F. Carbon Black _____ 30
Part B: As for Example I.

Parts A and B on being mixed (Part A constitutes the sixth illustrative composition) have a work life of five hours and after one day the composition cures to a hard rubber adherent to teak and beechwood.

*Example VII*

Part A:                                                  Parts
   Thiokol LP32 _____ 100
   S.R.F. Carbon Black _____ 30
   Dimethylol-p-cresol (crystalline) _____ 1
Part B: As for Example I.

Thiokol LP32 is a liquid polysulphide polymer having a molecular weight of 4,000 and prepared by condensing with an alkali polysulphide 99.5 mol percent of bis (2-chlorethyl) formal and 0.5 mol percent trichlorpropane.

Part A (the seventh illustrative composition) after being mixed with Part B has a work life of seven hours and cures to a hard rubber adhering well to Dural treated as in Example I.

*Example VIII*

Part A:                                             Parts
   Thiokol LP32 _____ 1,000
   Thermal Carbon Black _____ 400
   Oleic acid _____ 20
   Toluol _____ 100

Part B:
   Lead oxide _____ 100
   Dibutyl phthalate _____ 90
   Stearic acid _____ 10
   Dimethylol-p-cresol (crystalline) _____ 2

Part B is the eighth illustrative composition and comprises the dimethylol-p-cresol and curing agent but no liquid polysulphide polymer. Mixing of the Parts A and B results in a composition which can be applied by brush to a surface or poured into a crevice. The cured composition is found to adhere well to Dural treated as in Example I.

*Example IX*

Part A:                                             Parts
   Thiokol LP2 _____ 100
   S.R.F. Carbon Black _____ 20
   Oleic acid _____ 0.3
   Dimethylol-p-cresol (crystalline) _____ 0.6

Part B:
   Lead dioxide powder _____ 10

Part A (the ninth illustrative composition) and Part B are blended on a triple-roll mill. The mixture has a work life of three hours and sets overnight. It adheres well to wood and glass.

*Example X*

Part A:                                             Parts
   Thiokol LP2 _____ 1,000
   Mineral filler (activated calcium carbonate) 450
   Titanium dioxide _____ 75
   Stearic acid _____ 3
   Dimethylol-o-cresol (crystalline) _____ 10

Part B: As for Example I.

Part A (the tenth illustrative composition) mixed with Part B has a work life of three hours and after curing shows good adhesion to Dural treated as in Example I.

Having thus described my invention, what I claim as new and desire to secure by Letters Patent of the United States is:

1. A composition reactive to form a heat and petroleum solvent-resistant, rubbery body strongly adherent to surfaces to which it is applied comprising a low molecular weight liquid alkylene polysulphide polymer capable of being cured to form an elastimer, a small amount of a member of the group consisting of ar-alkyl substituted dimethylol phenols in which the alkyl group has from 1 to 8 carbon atoms and alkali metal salts thereof, and lead dioxide as a curing agent for the polysulphide polymer.

2. A composition reactive to form a heat and petroleum solvent-resistant, rubbery body strongly adherent to surfaces to which it is applied comprising a low molecular weight liquid alkylene polysulphide polymer capable of being cured to form an elastomer, a small amount in the range of from about 0.5% to about 10% by weight based on the weight of the polysulphide polymer of a member of the group consisting of ar-alkyl substituted dimethylol phenols in which the alkyl group has from 1 to 8 carbon atoms and alkali metal salts thereof, and lead dioxide as a curing agent for the polysulphide polymer.

3. A composition reactive to form a heat and petroleum solvent-resistant, rubbery body strongly adherent to surfaces to which it is applied comprising a low molecular weight liquid alkylene polysulphide polymer capable of being cured to form an elastomer, a small amount in the range of from about 0.1% to about 0.3% by weight based on the weight of the polysulphide polymer of dimethylol-o-cresol, a mineral filler, and lead dioxide as a curing agent for the polysulphide polymer.

4. A composition reactive to form a heat and petroleum solvent-resistant, rubbery body strongly adherent to surfaces to which it is applied comprising a low molecular weight liquid alkylene polysulphide polymer capable of being cured to form an elastomer, a small amount in the range of from about 0.1% to about 0.3% by weight based on the weight of the polysulphide polymer of dimethylol-p-cresol, a mineral filler, and lead dioxide as a curing agent for the polysulphide polymer.

5. A composition reactive to form a heat and petroleum solvent-resistant, rubbery body strongly adherent to surfaces to which it is applied comprising a low molecular weight liquid alkylene polysulphide polymer capable of being cured to form an elastomer, a small amount in the range of from about 0.1% to about 0.3% by weight based on the weight of the polysulphide polymer of the sodium salt of dimethylol-p-cresol, a mineral filler, and lead dioxide as a curing agent for the polysulphide polymer.

6. A composition stable on storage and reactive with lead dioxide to form a heat and petroleum solvent-resistant, rubbery body strongly adherent to surfaces to which it is applied, said composition comprising a low molecular weight liquid alkylene polysulphide polymer capable of being cured to form an elastomer, and a small amount of a member of the group consisting of ar-alkyl substituted dimethylol phenols in which the alkyl group has from 1 to 8 carbon atoms and alkali metal salts thereof.

7. A composition stable on storage and reactive with lead dioxide to form a heat and petroleum solvent-resistant, rubbery body strongly adherent to surfaces to which it is applied, said composition comprising a low molecular weight liquid alkylene polysulphide polymer capable of being cured to form an elastomer, a mineral filler and from about 0.05% to about 10% by weight based on the weight of the polysulphide polymer of a member of the group consisting of ar-alkyl substituted dimethylol phenols in which the alkyl group has from 1 to 8 carbon atoms and alkali metal salts thereof.

8. A composition stable on storage and reactive with lead dioxide to form a heat and petroleum solvent-resistant, rubbery body strongly adherent to surfaces to which it is applied, said composition comprising a first part containing a low molecular weight liquid alkylene polysulphide polymer capable of being cured to form an elastomer, a mineral filler and from about 0.05% to about 10% by weight based on the weight of the polysulphide polymer of a member of the group consisting of ar-alkyl substituted dimethylol phenols in which the alkyl group has from 1 to 8 carbon atoms and alkali metal salts thereof.

9. A composition stable on storage and reactive with lead dioxide to form a heat and petroleum solvent-resistant, rubbery body strongly adherent to surfaces to which it is applied, said composition comprising a low molecular weight liquid alkylene polysulphide polymer capable of being cured to form an elastomer, a mineral filler and a small amount in the range of from about 0.1% to about 0.3% by weight based on the weight of the polysulphide polymer of dimethylol-p-cresol.

10. A composition stable on storage and reactive with lead dioxide to form a heat and petroleum solvent-resistant, rubbery body strongly adherent to surfaces to which it is applied, said composition comprising a low molecular weight liquid alkylene polysulphide polymer capable of being cured to form an elastomer, a mineral filler and a small amount in the range of from about 0.1% to about 0.3% by weight based on the weight of the polysulphide polymer of dimethylol-o-cresol.

11. A composition stable on storage and reactive with lead dioxide to form a heat and petroleum solvent-resistant, rubbery body strongly adherent to surfaces to which it is applied, said composition comprising a low molecular weight liquid alkylene polysulphide polymer capable of being cured to form an elastomer, a mineral filler and a small amount in the range of from about 0.1% to about 0.3% by weight based on the weight of the polysulphide polymer of the sodium salt of dimethylol-p-cresol.

References Cited in the file of this patent

UNITED STATES PATENTS

| | | |
|---|---|---|
| 2,466,963 | Patrick et al. | Apr. 12, 1949 |
| 2,787,608 | Gregory et al. | Apr. 2, 1957 |
| 2,933,418 | Dogliotti et al. | Apr. 19, 1960 |
| 2,964,503 | Carpenter et al. | Dec. 13, 1960 |